(12) United States Patent
Titterington et al.

(10) Patent No.: US 6,437,155 B2
(45) Date of Patent: Aug. 20, 2002

(54) ANTHRAQUINONE COLORANTS FOR INKS

(75) Inventors: Donald R. Titterington, Tualatin; Jeffery H. Banning, Hillsboro, both of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/939,003

(22) Filed: Aug. 24, 2001

Related U.S. Application Data

(62) Division of application No. 09/512,896, filed on Feb. 25, 2000, now Pat. No. 6,284,028.

(51) Int. Cl.$^7$ .................. C09B 1/16
(52) U.S. Cl. .................. 552/238
(58) Field of Search .................. 552/238

(56) References Cited

U.S. PATENT DOCUMENTS

| | | |
|---|---|---|
| 2,050,662 A | 8/1936 | Koeberle et al. |
| 2,204,749 A | 6/1940 | Coffey et al. |
| 2,211,943 A | 8/1940 | Wilder et al. |
| 2,925,333 A | 2/1960 | Thompson et al. |
| 3,164,449 A | 1/1965 | Buxbaum et al. |
| 3,247,229 A | 4/1966 | Singer et al. |
| 3,597,254 A | 8/1971 | Graser et al. |
| 4,812,354 A | 3/1989 | Sugiyama et al. ........... 428/195 |
| 4,888,263 A | 12/1989 | Tomita et al. ............... 430/106 |
| 4,889,560 A | 12/1989 | Jaeger et al. .................. 106/27 |
| 4,889,761 A | 12/1989 | Titterington et al. ......... 428/195 |
| 5,231,135 A | 7/1993 | Machell et al. .............. 525/123 |
| 5,372,852 A | 12/1994 | Titterington et al. ........ 427/288 |
| 5,496,879 A | 3/1996 | Griebel et al. .............. 524/320 |
| 5,621,022 A | 4/1997 | Jaeger et al. ................ 523/161 |
| 5,700,851 A | 12/1997 | Banning et al. ............. 523/161 |
| 5,750,604 A | 5/1998 | Banning et al. ............. 524/187 |
| 5,780,528 A | 7/1998 | Titterington et al. ......... 523/161 |
| 5,782,966 A | 7/1998 | Bui et al. ................. 106/31.43 |
| 5,783,658 A | 7/1998 | Banning et al. ............. 528/590 |
| 5,817,843 A | 10/1998 | Masuda et al. .............. 552/250 |
| 5,827,918 A | 10/1998 | Titterington et al. ........ 524/590 |
| 5,830,942 A | 11/1998 | King et al. .................. 524/590 |

FOREIGN PATENT DOCUMENTS

| | | |
|---|---|---|
| EP | 0415857 A1 | 8/1990 |
| EP | 0775729 A1 | 8/1996 |
| GB | 1094925 | 12/1967 |
| SU | 375285 | * 4/1971 |

* cited by examiner

*Primary Examiner*—Alton Pryor
(74) *Attorney, Agent, or Firm*—Oliff & Berridge, PLC

(57) ABSTRACT

Solid inks and toners contain at least one colorant that includes at least one substituted-9,10-anthraquinone compound, substituted with at least one monofunctional amine. The colorant can be formed very efficiently, and the product can be used in desirable image formation methods.

18 Claims, No Drawings

ANTHRAQUINONE COLORANTS FOR INKS

This application is a divisional of application(s) Ser. No(s). 09/512,896, filed Feb. 25, 2000 now U.S. Pat. No. 6,284,028.

BACKGROUND OF THE INVENTION

1 Field of Invention

The present invention relates to selected anthraquinone colorants and their use in printing inks and toners, particularly phase change inks.

2. Description of Related Art

Many inks and toners have been developed in recent years for use in printing and xerographic processes, and are herein referred to as printing inks and toners. More recently, there has been a strong focus on colored printing inks and toners for creation and/or reproduction of colored images. Such printing inks and toners have specific requirements in terms of both colors and compatibility with the apparatus, substrates and conditions with which they are used. Likewise, the individual components of such printing inks and toners have specific requirements in terms of the same above variables plus compatibility with one another.

Phase change inks in digital printing applications (also sometimes called solid inks or hot melt inks) have in the past decade gained significant consumer acceptance as an alternative to more traditional printing systems such as offset printing, flexography printing, gravure printing, letterpress printing and the like. Phase change inks are especially desirable for the peripheral printing devices associated with computer technology, as well as being suitable for use in other printing technologies such as gravure printing applications as referenced in U.S. Pat. No. 5,496,879 and German Patent Publications DE 4205636AL and DE4205713AL assigned to Siegwerk Farlenfabrik Keller, Dr. Rung & Co.

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops.

They are easy to use and safe. They can be easily loaded into the printer by the user, generally in the form of solid sticks of yellow, magenta, cyan and black ink having a solid consistency similar to children's crayons. Inside the printer, these inks are melted at an elevated temperature in a print head having a number of orifices, through which the melted ink will be ejected onto the desired substrate such as media like paper or an overhead transparency film. Alternatively, the melted ink may be transferred to a rotating drum or the like and then transferred to the substrate. As the ink cools on the substrate, it re-solidifies into the desired image. This resolidification process, or phase change, is substantially instantaneous and a printed, dry image is thus available as the substrate leaves the printer, and is available immediately to the user.

Phase change inks need not contain solvents or diluents that can lead to undesired emissions. In all, the use and specific design of phase change inks address many of the limitations of more traditional ink and printing processes.

Furthermore, because the ink is in a cool, solid form at any time when the user can actually come in contact with the ink, and the ink is in a molten state only inside the printer (inaccessible to the user), it is generally safe to use. These inks also have long-term stability for shipping and long storage times.

Phase change inks generally comprise a phase change ink carrier composition, which is combined with at least one compatible phase change ink colorant. The carrier composition has been generally composed of resins, fatty acid amides and resin derived materials. Also, plasticizers, waxes, antioxidants and the like have been added to carrier compositions. Generally the resins used are water-insoluble and the carrier composition preferably contains no ingredients that are volatile at the jetting temperatures employed. Also, these carrier ingredients are preferably chemically stable so as not to lose their chemical identity over time and/or under elevated temperature conditions.

Preferably, a colored phase change ink will be formed by combining an ink carrier composition with compatible colorant material, preferably subtractive primary colorants. The subtractive primary colored phase change inks comprise four component dyes, namely, cyan, magenta, yellow and black. U.S. Pat. Nos. 4,889,560 and 5,372,852 teach preferred subtractive primary colorants employed. Typically these may comprise dyes from the classes of Color Index (C.I.) Solvent Dyes, C.I. Disperse Dyes, modified C.I. Acid and Direct Dyes, as well as a limited number of C.I. Basic Dyes. Suitable colorants also include appropriate polymeric dyes, such as those described in U.S. Pat. No. 5,621,022 and available from Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, and uncut Reactant Violet X-80, and those described in U.S. Pat. No. 5,231,135.

Colored resin reaction products such as those described in U.S. Pat. No. 5,780,528 issued Jul. 14, 1998, and assigned to the assignee of the present invention, are also suitable colorants.

Polymeric colorants have also been utilized in preparing commercial phase change ink jet inks, as well as potentially for use in other applications, such as gravure printing, and other types of inks and coating applications where coloration is desired. For example, the specific class of polymeric dyes characterized by: (1) an organic chromophore having (2) a polyoxyalkylene substituent and optionally (3) a carboxylic acid or non-reactive derivative thereof covalently bonded to the polyoxyalkylene substituent, have been described in U.S. Pat. No. 5,621,022 (Jaeger et al.).

Anthraquinone dyes and pigments have been employed as chromogens for many applications where colorants are required. Furthermore, it is known to make many derivatives of anthraquinones for specific colorant applications. Yet, anthraquinones and their derivatives have some shortcomings when used in phase change inks. For example, solubility and blooming problems often arise when known anthraquinone dyes are used in phase change inks. They are believed to be caused by the planar nature of the molecules of these colorants. Aggregation of dye moieties can take place more readily when the dye molecules are planar in nature. This aggregation leads to solubility problems at operating temperatures inside printers. Furthermore, unaggregated dye molecules may work their way to the surface of the hardened phase change ink stick, resulting in blooming problems. Furthermore, the manufacturing processes for making commercially available anthraquinone derivative dyes have several disadvantages (e.g., solvents are typically used in making such derivatives, thus requiring solvent recovery, and such processes also involve elaborate purification procedures).

SUMMARY OF THE INVENTION

The present invention retains known advantages of anthraquinone chromogens (e.g., wide variety of red to purple to cyan shades, outstanding lightfastness and thermal stability) while overcoming solubility and blooming problems of conventional anthraquinone colorants as well as eliminating manufacturing disadvantages of their preparation.

One aspect of the present invention is directed to solid ink and toner compositions that comprise a colorant that comprises a monofunctional amine-substituted-9,10-anthraquinone compound, optionally with at least one carrier component.

It is a feature of the present invention that this class of anthraquinone, dyes can be easily tailored by adjusting the degree of substitution by monofunctional amine substitutents to provide a desirable range of particular color shades.

It is another feature of the present invention that preferred dyes of this class of anthraquinones are liquid at the elevated temperatures at which phase change ink printers and toner fusing apparatus operate, yet are solid at room temperatures.

It is another feature of the present invention that these anthraquinone dyes may be used as either the sole colorant material or can be used with other conventional phase change ink colorant materials in a phase change ink.

It is still another feature of the present invention that these anthraquinone dyes may be employed with conventional phase change carrier components or conventional toner particle carrier components.

It is an advantage of the present invention that this class of anthraquinone dyes is easy to manufacture and form into useful shapes such as ink sticks.

It is an advantage of the present invention that this class of anthraquinone dyes may be made without additional solvents or the need for elaborate purification processes. The amine reactant can act as an initial solvent for the reaction and as the dye reaction product is made, it also can act as a solvent (i.e., it is a liquid at the elevated temperatures at which the reaction is run). This greatly simplifies the manufacture of these dyes.

It is another advantage of the present invention that these anthraquinone dyes do not display typical characteristics of planar molecules because they have sufficiently large substituents condensed thereonto which prevent the anthraquinone molecules from aggregating, as well as compatibilizing the molecules in an ink or toner base, and thus do not have solubility and blooming problems associated with other anthraquinone dyes. Furthermore, these anthraquinone dyes retain desired lightfastness and thermal stability properties for which anthraquinone dyes are known.

DETAILED DESCRIPTION OF PREFERRED EMBODIMENTS

The term "9,10-anthraquinone" as used herein refers to anthraquinone having the following chemical formula and numbering sequence:

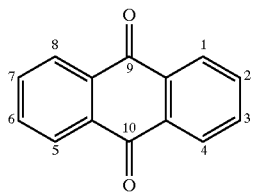

The 9,10-anthraquinone compounds of the present invention may be substituted by the same or different amines at any available position, such as the 1, 2, 3, 4, 5, 6, 7, and/or 8 position(s). Preferably, the 9,10-anthraquinone is substituted at the 1, 4, 5 and/or 8 position(s). Examples of such compounds include, but are not limited to, the 1-; 1, 4-; 1, 4, 5-; 1, 4, 8-; and 1, 4, 5, 8-substituted-9,10-anthraquinone compounds. In dyes used in the invention, the substituents are preferably monofunctional amines, optionally in combination with oxy-substituents.

Preferred precursor compounds are halo- or oxy-substituted-9,10-anthraquinone compounds. As used herein, the term "oxy-substituted-9,10-anthraquinone compound" refers to any 9,10-anthraquinone compound having one or more additional carbonyl groups on one or both of the outer rings, for example, in the positions described above, and tautomers thereof. Halo-substituted-9,10-anthraquinones have halo-substituents such as chloro-substitutents at the corresponding position(s).

The term "substituted-9,10-anthraquinone compound" as used herein refers to any 9,10-anthraquinone compound or reduced form thereof having one or more substituent groups on one or both of the outer rings, and tautomers thereof. One preferred class of these anthraquinone compounds is the 1,4-oxy-substituted-9,10-anthraquinone compounds (i.e., carbonyl groups are on both of the 1-and 4- positions of one of the outer rings).

Examples of 1,4-oxy-substituted-9,10-anthraquinone compounds include leucoquinizarin and quinizarin. Leucoquinizarin is the reduced form of quinizarin and has the following chemical formula (1):

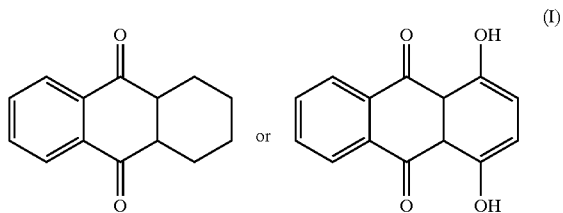

Quinizarin has the following chemical formula (II):

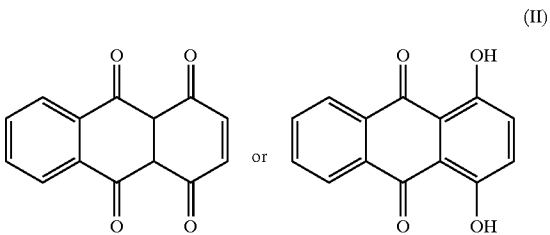

It is particularly preferred to use a mixture of quinizarin and leucoquinizarin. Because quinizarin is less expensive than leucoquinizarin and also is available in a highly purified "sublimed" form; the preferred molar ratio is in the range of about 1 to about 10 moles of quinizarin per mole of leucoquinizarin.

Suitable monofunctional amines include any monofunctional amine that is capable of being placed on the 9,10-anthraquinone compound, for example by reacting with the oxy-substituted-9,10-anthraquinone compound, to make a suitable colorant or colorants. Preferred monofunctional amines include but are not limited to aliphatic monoamines, aromatic monoamines, aliphatic/aromatic monoamines, fused ring system monoamines, polyoxyalkylenemonoamines, and hydroxyl/amino-containing compounds.

Examples of aliphatic monoamines include any aliphatic primary or secondary amine (e.g., a $C_1$–$C_{22}$, preferably $C_{12-18}$ and more preferably $C_{16-18}$, or higher linear amine, any branched amine or any cyclic aliphatic amine), such as mono- or di-: methyl amine, ethyl amine, (n- and iso)propyl amines, (n-, iso-, and t-) butylamines, (n-, iso-, t-, and the like) pentyl amines, (n-, iso- t-, and the like) hexyl amines, cyclohexyl amines, (n-, iso-, t-, and the like) heptyl amines, (n-, iso-, t-, and the like) octyl amines, (n-, iso-, t, and the like) nonyl amines, (n- and branched) decyl amines, (n- and branched) undecyl amines, (n- and branched) dodecyl amines, (n- and branched) hexadecyl amines, (n- and branched) octadecyl amines, tallow amines, 2,3-dimethyl-1-cyclohexylamine, piperidine, pyrrolidine, and the like. Tallow amines are particularly preferred.

Examples of aromatic monoamines include aniline, anisidine, and the like.

Examples of aliphatic/aromatic amines include aliphatic/aromatic compounds in which the amino group is attached to the aliphatic portion, such as benzyl amine or analogues with longer or additional alkyl chains, and aliphatic/aromatic compounds in which the amino group is attached to the aromatic portion, such as dodecylaniline or analogues with longer, shorter and/or additional alkyl chains.

Examples of fused ring monoamines include rosin amine, dehydroabietyl amine, dihydroabietyl amine, hydroabietyl amine, and the like, such as Amine D™ available commercially from Hercules Inc. of Wilmington, Del.

Examples of hydroxyl/amino compounds include ethanol amine or aminopropyldiethylene glycol, commercially available from Dixie Chemical Company of Pasadena, Tex.

Examples of polyoxyalkylenemonoamines include M-series Jeffamines available commercially from Huntsman Chemical Company of Austin, Texas, and the like, such as R—O—($CH_2$—CH($CH_3$)—O)$_n$—$CH_2$—CH($CH_3$)—$NH_2$ wherein R is a lower, such as C1–4, alkyl and n is an integer. It should be noted that the condensation product of M-series Jeffamines and the oxy-substituted-9,10-anthraquinone compounds would likely be a viscous liquid at room temperature.

Preferred monofunctional amines are aliphatic monoamines, such as octadecyl and tallow amines.

If leucoquinizarin, or a quinizarin/leucoquinizarin mixture, and a monoamine R—$NH_2$ are reacted together, the reaction products can be illustrated by the following chemical formulae (III) and (IV):

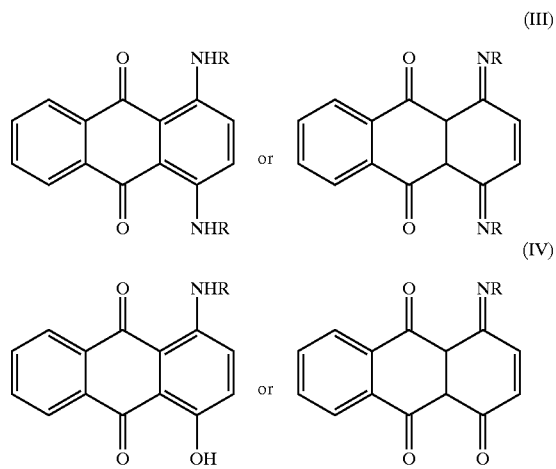

Similarly, reaction of the following 9,10-anthraquinone compounds with monoamines R—$NH_2$ under known reducing conditions produces the following reaction products:

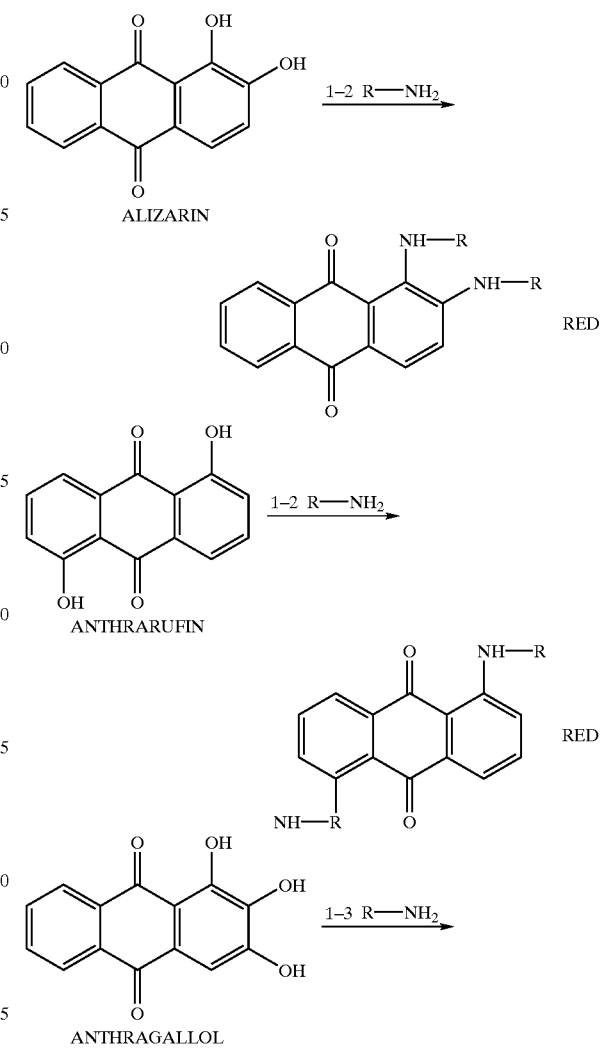

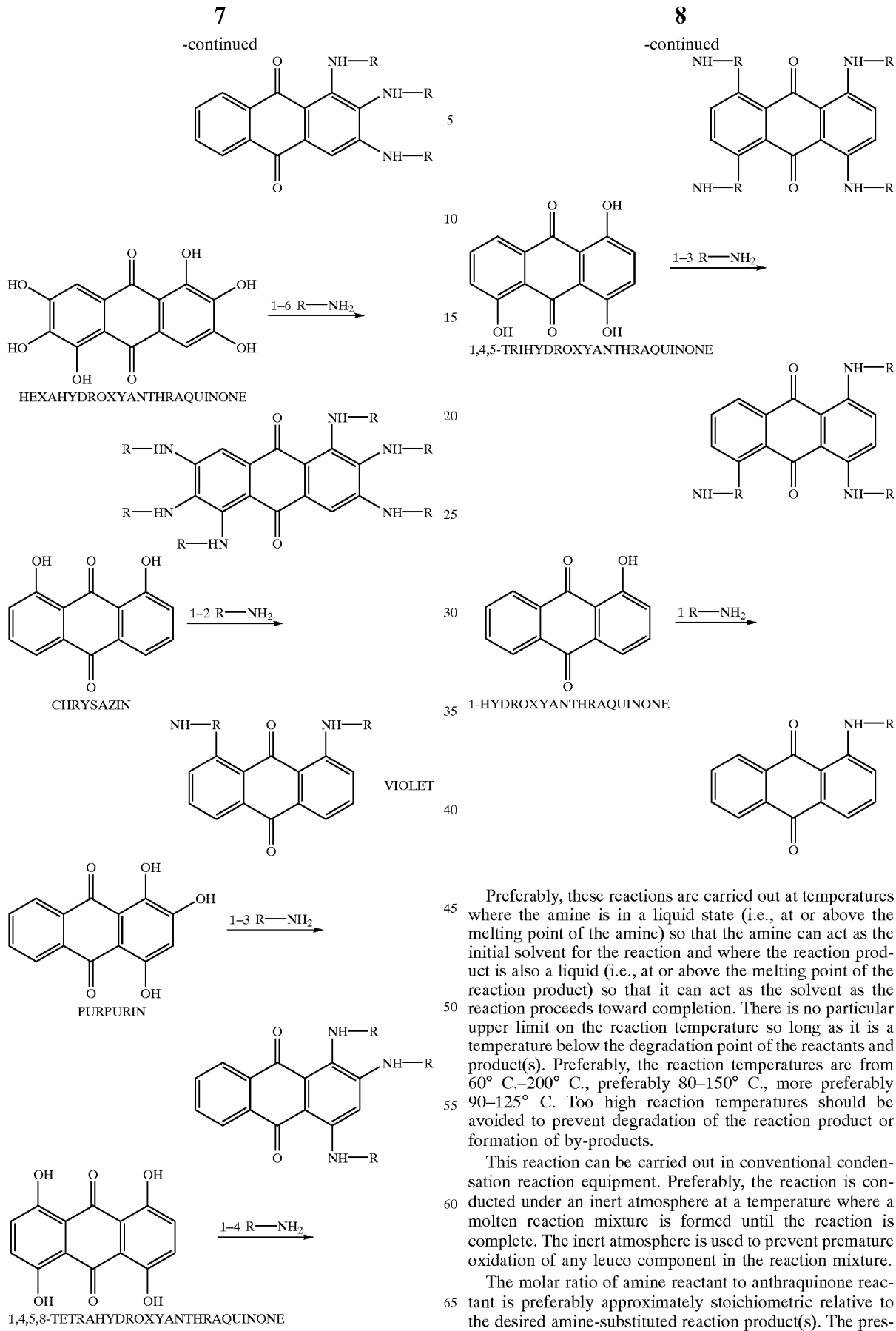

Preferably, these reactions are carried out at temperatures where the amine is in a liquid state (i.e., at or above the melting point of the amine) so that the amine can act as the initial solvent for the reaction and where the reaction product is also a liquid (i.e., at or above the melting point of the reaction product) so that it can act as the solvent as the reaction proceeds toward completion. There is no particular upper limit on the reaction temperature so long as it is a temperature below the degradation point of the reactants and product(s). Preferably, the reaction temperatures are from 60° C.–200° C., preferably 80–150° C., more preferably 90–125° C. Too high reaction temperatures should be avoided to prevent degradation of the reaction product or formation of by-products.

This reaction can be carried out in conventional condensation reaction equipment. Preferably, the reaction is conducted under an inert atmosphere at a temperature where a molten reaction mixture is formed until the reaction is complete. The inert atmosphere is used to prevent premature oxidation of any leuco component in the reaction mixture.

The molar ratio of amine reactant to anthraquinone reactant is preferably approximately stoichiometric relative to the desired amine-substituted reaction product(s). The presence of residual amines in the reaction product is not advantageous. Such excess amines tend to be reactive, and can be corrosive to materials with which the dye comes into contact, such as components of a printing machine. In addition, they tend to oxidize and cause discoloration of the ink or toner product. By using stoichiometric amounts of the amines under the conditions described above, these disadvantages are avoided at the same time that the costs of additional amine and the costs and delays of amine and/or solvent removal process steps are avoided.

Thus, for example, with quinizarin and/or leucoquinizarin, the molar ratio of amine reactant to anthraquinone reactant is preferably from about 0.5:1 to about 2:1, such as from about 1:1 to about 2:1. A molar ratio of about 2:1 favors the formation of a cyan colored dye (which is mainly a diamine substituted-9,10 anthraquinone); a molar ratio of 1.5:1 favors a royal blue-colored dye (which is a mixture of monoamine and diamine-substituted-9,10-anthraquinone; a molar ratio of 1:1 favors the formation of a purple-colored dye (which is mainly a monoamine substituted-9,10-anthraquinone).

Colorant compounds of the present invention may be combined with other colorants in making an ink or toner composition. For example, it may be desirable for certain applications to combine the present colorant or colorants with one or more polymeric dyes as described in U.S. Pat. No. 5,621,022 or conventional phase change ink colorants such as those described in U.S. Pat. Nos. 4,889,560 and 5,372,852, which are hereby incorporated by reference in their entirety.

Furthermore, one or more anthraquinone colorants of the present invention (either with or without other colorants present) may be combined with conventional ink or toner particle components, including but not limited to toner resins, charge control agents, flow agents and the like and phase change ink carrier components such as amide waxes (e.g., tetra-amide compounds, hydroxyl-functional tetra-amide compounds, mono-amides, hydroxyl-functional mono-amides), resinous components (e.g., urethane and urea resins, mixed urethane/urea resins), tackifiers, toughening agents, hardeners, adhesion promoters, plasticizers, antioxidants, viscosity reducing agents such as those disclosed in U.S. Pat. Nos. 4,889,560; 4,889,761; 5,372,852; 5,621,022; 5,700,851; 5,750,604; 5,780,528; 5,782,966; 5,783,658; 5,827,918; and 5,830,942, each of which is hereby incorporated by reference in its entirety, and the like.

The preferred amounts of each colorant and its components will depend upon the particular end use application. For example, some colorants of the invention can be used alone in applications such as phase change ink printing, where they have a melting temperature and a viscosity at the jetting temperature that closely parallel those of other phase change inks (e.g., a viscosity of 11–13 cPs at 140° C.). This can provide sharp images with a relatively low volume of ink, with various attendant benefits. On the other hand, they can also provide good coloration in amounts of one percent or less by weight with other ink or toner components. Thus amounts such as 0.5–10 wt %, 1–5 wt. % or 1–2 wt. % are desirable for some applications.

Inks and toners of the invention may be used to form images in printing and xerographic processes as described above, and in other ways. For example, inks of the invention may be used as phase change inks in ink jet printing devices, wherein they are melted and droplets of them are ejected directly onto a substrate, or onto an intermediate transfer member such as a drum or belt and then transferred to a substrate. Toner particles of the invention may similarly be electrostatically attracted to an imaging member such as a photoreceptor or the like and transferred directly or through an intermediate transfer member, and fused to the substrate by pressure and/or heat.

The following Examples are presented to illustrate the invention and to be illustrative of the formulations that can successfully be employed, without any intent to limit the invention to the specific materials, processes or structures employed. All parts and percentages are by weight and all temperatures are degrees Celsius unless explicitly stated otherwise.

EXAMPLE 1

Cyan Dye Made from Leucoquinizarin, Quinizarin and Octadecylamine

To a 1000 ml four-neck resin kettle equipped with a Trubore™ stirrer and thermocouple-temperature controller, $N_2$ atmosphere, and vacuum adapter were added about 25.0 grams (0.103 moles) of leucoquinizarin,[1] about 75.0 grams (0.313 moles) of quinizarin,[2] and about 223.7 grams (0.831 moles) of octadecyl amine[3] and stirred thoroughly. The mixture was carefully heated to 90° C. with $N_2$ atmosphere, at which time it became molten and agitation was begun. After 2.5 hours at 90° C., $N_2$ addition was stopped, vacuum was introduced to the reaction vessel and the temperature was increased to 100° C. After 30 minutes the vacuum was removed and $N_2$ re-introduced, and the temperature was maintained at 100° C. for 1 hour. A sample was taken and an absorbance ratio at 600 and 650 nms measured, in toluene, using a Perkin Elmer Lambda 2S UV/VIS spectrophotometer. The ratio was less than the desired 0.90 and there was little to no absorbance in the 450–500 nm range. The $N_2$ atmosphere was removed and air (containing $O_2$) was vigorously blown into the reaction vessel to ensure complete oxidation. After 2 hours the spectral strength and absorbance ratio were measured on a sample and indicated that the reaction was complete. The final product was a blue solid wax at room temperature characterized by the following physical properties: viscosity of about 10.8 cPs as measured by a Ferranti-Shirley cone-plate viscometer at about 140° C., and a spectral strength of about 20,900 milliliters·absorbance units per gram at lambda$_{max}$ as measured in toluene using a Perkin Elmer Lambda 2S UV/VIS spectrophotometer. The final product is believed to be the compound having the chemical formula III shown above:

[1]Leucoquinizarin—available from Aldrich Chemicals of Milwaukee, Wis.
[2]Quinizarin—available from Aceto Corp. of Lake Success, N.Y.
[3]ARMEEN 18D FLK—octadecyl amine available from Akzo Nobel Chemicals Inc. of McCook, Ill.

EXAMPLE 2

Royal Blue Dye made from Leucoquinizarin, Quinizarin and Octadecyl Amide

To a 140 ml beaker equipped with a Teflon™ coated magnetic stir bar and placed in a silicone oil bath on a stirring hot plate were added about 12.1 grams (0.05 moles) of leucoquinizarin,[1] about 12.0 grams (0.05 moles) of quinizarin,[2] and about 40.4 grams (0.150 moles) octadecyl amine[3] and stirred thoroughly. The mixture was carefully heated to 70° C. with $N_2$ atmosphere, at which time it became molten and agitation was begun. After 2.0 hours at 70° C., the temperature was slowly increased to 115° C. over 1 hour and held for an additional hour. During this time samples were taken and diluted in toluene and measured in a UV/VIS spectrophotometer to monitor reaction completion. $N_2$ addition was stopped, and an $O_2$ atmosphere introduced to the reaction vessel, and the temperature was increased to 140° C. After 2 hours at 140° C., a sample was taken and an absorbance ratio at 600 and 650 nms measured, in toluene, using a Perkin Elmer Lambda 2S UV/VIS spectrophotometer. The ratio was 0.927 and there was little to no absorbance in the 450–500 range. The spectral strength of about 18,020 milliliters·absorbance units per gram at $lambda_{max}$ was measured in toluene using a Perkin Elmer Lambda 2UN/VIS spectrophotometer. The final product is believed to be two compounds with the chemical formulae of III and IV above.

[1]Leucoquinizan—available from Aldrich Chemicals of Milwaukee, Wis.
[2]Quinizarin—available from Aceto Corp. of Lake Success, N.Y.
[3]ARMEEN 18D FLK—octadecyl amine available from Akzo Nobel Chemicals Inc. of McCook, Ill.

EXAMPLE 3

Purple Dye Made from Leucoquinizarin, Quinizarin and Octadecyl Amide

To a 500 ml four-neck resin kettle equipped with a Trubore™ stirrer and thermocouple-temperature controller, vacuum adapter, and $N_2$ atmosphere were added about 30.0 grams (0.125 moles) of quinizarin[2] and about 49.2 grams (0.183 moles) octadecyl amine[3] and stirred thoroughly. The mixture was carefully heated to 80° C. with $N_2$ atmosphere, at which time it became molten and agitation was begun. At that time, about 12.2 grams (0.0504 moles) of leucoquinizarin[1] were added over 30 minutes and the temperature was increased to 90° C. with a $N_2$ atmosphere maintained. After 40 minutes at 90° C. the temperature was increased to 100° C. After 1 hour at 100° C. the temperature was increased to 110° C. After about 7 hours at 110° C., the $N_2$ atmosphere was removed and an $O_2$ atmosphere introduced. The heating was continued for about 3 hours. A sample was taken and an absorbance ratio at 602 and 561 nms measured, in toluene, using a Perkin Elmer Lambda 2S UV/VIS spectrophotometer. The final product was a purple solid wax at room temperature characterized by the following physical properties: Spectral strength of about 19,162 milliliters·absorbance units per gram at $lambda_{max}$ as measured in toluene using a Perkin Elmer Lambda 2SU/VIS spectrophotometer. The final product is believed to be the compound having the chemical formula IV above.

[1]Leucoquinizarin—available from Aldrich Chemicals of Milwaukee, Wis.
[2]Quinizarin—available from Aceto Corp. of Lake Success, N.Y.
[3]ARMEEN 18D FLK—octadecyl amine available from Akzo Nobel Chemicals Inc. of McCook, Ill.

EXAMPLE 4

Cyan Hybrid Ink Made from a Hybrid Ink Base and Cyan Colored Substituted Anthraquinone Dye In a stainless steel beaker were combined 345.6 grams of the molten reaction mixture from Example 5 from U.S. Ser. No. 09/023,366, filed Feb. 13, 1998, 123.5 grams of molten Polywax PE850[1] (250 grams), 8.3 grams of the cyan dye from Example 1 and 24.3 grams of the urethane/urea resin from Example 2 of U.S. Pat. No. 5,830,942 as a viscosity adjuster. The materials were blended by stirring in a temperature controlled mantle for 2 hours at 125° C. The ink was then filtered through a heated (125° C.) Mott apparatus (available from Mott Metallurgical) using a #3 Whatman filter paper at 15 psi. The filtered hybrid ink was poured into molds and allowed to solidify to form ink sticks. The final cyan ink product was characterized by following physical properties: viscosity of about 11.5 cPs at 140° C. as measured by a Ferranti-Shirley cone-plate viscometer, and two melting points at about 91° C. and about 105° C. as measured by differential scanning calorimetry using a duPont 2100 calorimeter. The Tg of this ink was not measured. The spectral strength of the ink was determined using a spectrophotographic procedure based on the measurement of the colorant in solution by dissolving the ink in butanol and measuring the absorbance using a Perkin Elmer Lambda 2S UV/VIS spectrophotometer. The spectral strength of the ink was measured as about 340 milliliters·absorbance units per gram at the $lambda_{max}$ of 647 nm. This ink was placed in a Phaser 350 printer which uses an offset transfer printing process. The ink was printed using a print head temperature of 140° C., a drum temperature of 60° C. and a paper preheat temperature of 60° C. The finished cyan prints were found to have the following CIELab color values:

|  | l* | a* | b* |
| --- | --- | --- | --- |
| CYAN INK ON PAPER | 57.2 | −3.7 | −31.4 |

[1]Polywax PE850-Polyethylene wax available from Baker Petrolite Co. of Tulsa, Oklahoma.

EXAMPLE 5

Black Hybrid Ink Made from a Polycarbonate-Modified Hybrid ink Base, Blue Colored Substituted Anthraquinone Dye and Commercial Red and Orange Dyes In a stainless steel beaker were combined 135 grams of the polycarbonate-modified resin from Example 11 of U.S. patent application Ser. No. 09/023,851, 166.7 grams of Polywax PE850[1] and 141 grams of S-180 amide wax,[2] 22.9 grams of the royal blue dye from Example 2, 1.03 grams of Solvent Red 195[3] dye and 2.28 grams of Disperse Orange 47[4] dye. The materials were melted by placing them in a 135° C. oven overnight, then blended by stirring in a temperature controlled mantle for 2 hours at 125° C. The ink was then filtered through a heated (125° C.) Mott apparatus (available from Mott Metallurgical) using a #3 Whatman filter paper at 15 psi. The filtered hybrid ink was poured into molds and allowed to solidify to form ink sticks. The final black ink product was characterized by the following physical properties: viscosity of about 12.9 cPs at 140° C. as measured by a Ferranti-Shirley cone-plate viscometer, and two melting points at about 91° C. and about 105° C. as measured by differential scanning calorimetry using a duPont 2100 calorimeter. The Tg of this ink was not measured. The spectral strength of the ink was determined using a spectrophotographic procedure based on the measurement of the colorant in solution by dissolving the ink in butanol and measuring the absorbance using a Perkin Elmer Lambda 2S UV/VIS spectrophotometer. The spectral strength of the ink measured as about 1100 milliliters·absorbance units per gram at the $lambda_{max}$ of 599 nm. This ink was placed in a Phaser 340 printer which uses an offset transfer printing process. The ink was printed using a print head temperature of 140° C., a drum temperature of 60° C. and a paper preheat temperature of 60° C. The finished black prints were found to have the following CIELab color values.

|  | L* | a* | b* |
|---|---|---|---|
| BLANK INK ON PAPER | 20.4 | 0.4 | 0.2 |

[1]Polywax PE850-Polyethylene wax available from Baker Petrolite Co. of Tulsa, Oklahoma.
[2]Kemamide S-180-stearyl stearamide available from Witco Chemical Company of Memphis, Tennessee.
[3]Solvent Red 195-Solvaperm Red BB available from Clariant GmbH, Frankfurt, Germany.
[4]Disperse Orange 17-Macrolex Orange R available from Keystone Inc., Chicago, Illnois.

EXAMPLE 6

Black Hybrid Ink Made from a Polycarbonate-Modified Hybrid Ink Base, Blue Colored Substituted Anthraquinone Dye, Violet Colored Substituted Anthraquinone Dye and Commerical and Orange Dye In a stainless steel beaker were combined 135 grams of the polycarbonate-modified resin from Example 11 of U.S. patent application Ser. No. 09/023,851, 117.3 grams of Polywax PE850[1], 141 grams of S-180 amide wax,[2] 16.7 grams of the blue dye from Example 2, 8.3 grams of the violet dye from Example 3, and 2.72 grams of disperse Orange 47[3] dye. The materials were melted by placing them in a 135° C. oven overnight, then blended by stirring in a temperature controlled mantle for 2 hours at 125° C. The ink was then filtered through a heated (125° C.) Mott apparatus (available from Mott Metallurgical) using a #3 Whatman filter paper at 15 psi. The filtered hybrid ink was poured into molds and allowed to solidify to form ink sticks. The final black ink product was characterized by the following physical properties: viscosity of about 12.2 cPs at 140° C. as measured by a Ferranti-Shirley cone-plate viscometer, and two melting points at about 91° C. and about 105° C. as measured by differential scanning calorimetry using a duPont 2100 calorimeter. The Tg of this ink was not measured. The spectral strength of the ink was determined using a spectrophotographic procedure based on the measurement of the colorant in solution by dissolving the ink in butanol and measuring the absorbance using a Perkin Elmer Lambda 2S UV/VIS spectrophotometer. The spectral strength of the ink was measured as about 1182 milliliters·absorbance units per gram at the lambda$_{max}$ of 599 nm. This ink was placed in a Phaser 340 printer which uses an offset transfer printing process. The ink was printed using a print head temperature of 140° C., a drum temperature of 60° C. and a paper preheat temperature of 60° C. The finished

|  | L* | A* | B* |
|---|---|---|---|
| BLACK INK ON PAPER | 21.4 | 1.7 | 1.8 |

[1]Polywax PE850-Polyethylene wax available from Baker Petrolite Co. of Tulsa, Oklahoma.
[2]Kemamide S-180-stearyl steramide available from Witco Chemical Company of Memphis, Tennessee.
[3]Disperse Orange 47-Macrolex Orange R available from Keystone Inc., Chicago, Illnois.

While the invention has been described above with reference to specific embodiments thereof, it is apparent that many changes, modifications, and variations can be made without departing from the inventive concept disclosed herein.

Accordingly, the spirit and broad scope of the invention is intended to embrace all such changes, modifications and variations that may occur to one reading the disclosure. All patent applications, patents and other publications cited herein are hereby incorporated by reference in their entirety.

What is claimed is:

1. A colorant for an ink or toner, comprising a 9,10-anthraquinone compound substituted with tallow amine.

2. A method of forming a colorant compound, comprising reacting an oxy- or halo-substituted-9,10-anthraquinone compound with at least one monofunctional amine to form a monofunctional amine-substituted-9,10-anthraquinone colorant compound product, wherein said monofunctional amine is provided in a substantially stoichiometric amount relative to said product, and the reaction is carried out at a temperature above the melting points of both said monofunctional amine and said product, and wherein said substituted-9,10-anthraquinone compound comprises leucoquinizarin.

3. The method of claim 2, wherein the substituted-9,10-anthraquinone compound is a 1,4-oxy- or 1,4-halo-substituted-9,10-anthraquinone.

4. The method of claim 2, wherein the substituted-9,10-anthraquinone compound consists of leucoquinizarin.

5. The method of claim 2, wherein the substituted-9,10-anthraquinone compound is a mixture of quinizarin and leucoquinizarin.

6. The method of claim 2, wherein said at least one monofunctional amine is at least one member selected from the group consisting of aliphatic monoamines, aromatic monoamines, aliphatic/aromatic monoamines, fused ring system monoamines, polyoxyalkylenemonoamines, and hydroxyl/amino-containing compounds.

7. The method of claim 2, wherein said at least one monofunctional amine is at least one $C_{16-18}$ aliphatic amine.

8. The method of claim 3, wherein a molar ratio of said amine to said 9,10-anthraquinone compound is from about 1:1 to about 2:1.

9. The method of claim 2, wherein said reaction is carried out under reducing conditions.

10. The colorant according to claim 1, wherein said 9,10-anthraquinone compound is selected from the group consisting of 1-substituted-9,10-anthraquinone compounds, 2-substituted-9,10-anthraquinone compounds, 1,5-substituted-9,10-anthraquinone compounds, 1,8-substituted-9,10-anthraquinone compounds, 1,4,5-substituted-9,10-anthraquinone compounds, and 1,4,5,8-substituted-9,10-anthraquinone compounds.

11. The method according to claim 2, wherein said monofunctional amine-substituted-9,10-anthraquinone colorant compound product is selected from the group consisting of 1-substituted-9,10-anthraquinone compounds, 2-substituted-9,10-anthraquinone compounds, 1,5-substituted-9,10-anthraquinone compounds, 1,8-substituted-9,10-anthraquinone compounds, 1,4,5-substituted-9,10-anthraquinone compounds, and 1,4,5,8-substituted-9,10-anthraquinone compounds.

12. A method of forming a colorant compound, comprising reacting an oxy- or halo-substituted-9,10-anthraquinone compound with at least one monofunctional amine to form a monofunctional amine-substituted-9,10-anthraquinone colorant compound product, wherein said monofunctional amine is provided in a substantially stoichiometric amount relative to said product, and the reaction is carried out at a temperature above the melting points of both said monofunctional amine and said product, wherein said at least one monofunctional amine is at least one tallow amine.

13. The method of claim 12, wherein the substituted-9,10-anthraquinone compound is a 1,4-oxy- or 1,4-halo-substituted-9,10-anthraquinone.

14. The method of claim 12, wherein the substituted-9,10-anthraquinone compound is leucoquinizarin.

15. The method of claim 12, wherein the substituted-9,10-anthraquinone compound is quinizarin.

16. The method of claim 12, wherein the substituted-9,10-anthraquinone compound is a mixture of quinizarin and leucoquinizarin.

17. The method of claim 13, wherein a molar ratio of said amine to said 9,10-anthraquinone compound is from about 1:1 to about 2:1.

18. The method of claim 12, wherein said reaction is carried out under reducing conditions.

* * * * *